(12) United States Patent
Kang et al.

(10) Patent No.: US 6,233,216 B1
(45) Date of Patent: May 15, 2001

(54) DEVICE FOR LOADING A TRAY DOWN INTO A PICK UP DISK PLAYER

(75) Inventors: Seong Sik Kang, Kyungki-do; Tae Hyong Kim, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/928,336

(22) Filed: Sep. 12, 1997

(30) Foreign Application Priority Data

Sep. 13, 1996 (KR) .................................................. 96-39681

(51) Int. Cl.[7] .................................................. G11B 33/02
(52) U.S. Cl. .......................................... 369/77.1; 369/75.2
(58) Field of Search ................................. 369/75.1, 75.2, 369/77.1, 77.2, 37; 360/99.02, 99.06

(56) References Cited

U.S. PATENT DOCUMENTS

| | | | |
|---|---|---|---|
| 5,123,005 | * 6/1992 | Kurosu | 369/77.1 |
| 5,172,361 | * 12/1992 | Urushibata et al. | 369/77.1 |
| 5,204,850 | * 4/1993 | Obata | 369/75.2 |
| 5,218,593 | * 6/1993 | Kaneo et al. | 369/77.1 |
| 5,386,403 | * 1/1995 | Morioka et al. | 369/37 |
| 5,513,157 | * 4/1996 | Saito et al. | 369/34 |
| 5,608,705 | * 3/1997 | Tanaka | 369/77.1 |
| 5,793,729 | * 8/1998 | Soga et al. | 369/77.1 |

* cited by examiner

Primary Examiner—William R. Korzuch
Assistant Examiner—Kenneth W. Fields
(74) Attorney, Agent, or Firm—Finnegan, Henderson, Farabow, Garrett & Dunner, L.L.P.

(57) ABSTRACT

A loading device for moving a tray of a disc player apparatus having a tray for movement between a loaded position and an ejected position; a loading motor having a motor shaft and being mounted on a main base; and driving elements for moving the tray between the loaded position and the ejected position by power derived from the loading motor. The driving elements are rotatively mounted centering on the motor shaft of the loading motor.

2 Claims, 6 Drawing Sheets

FIG · 3

PRIOR ART

FIG · 6
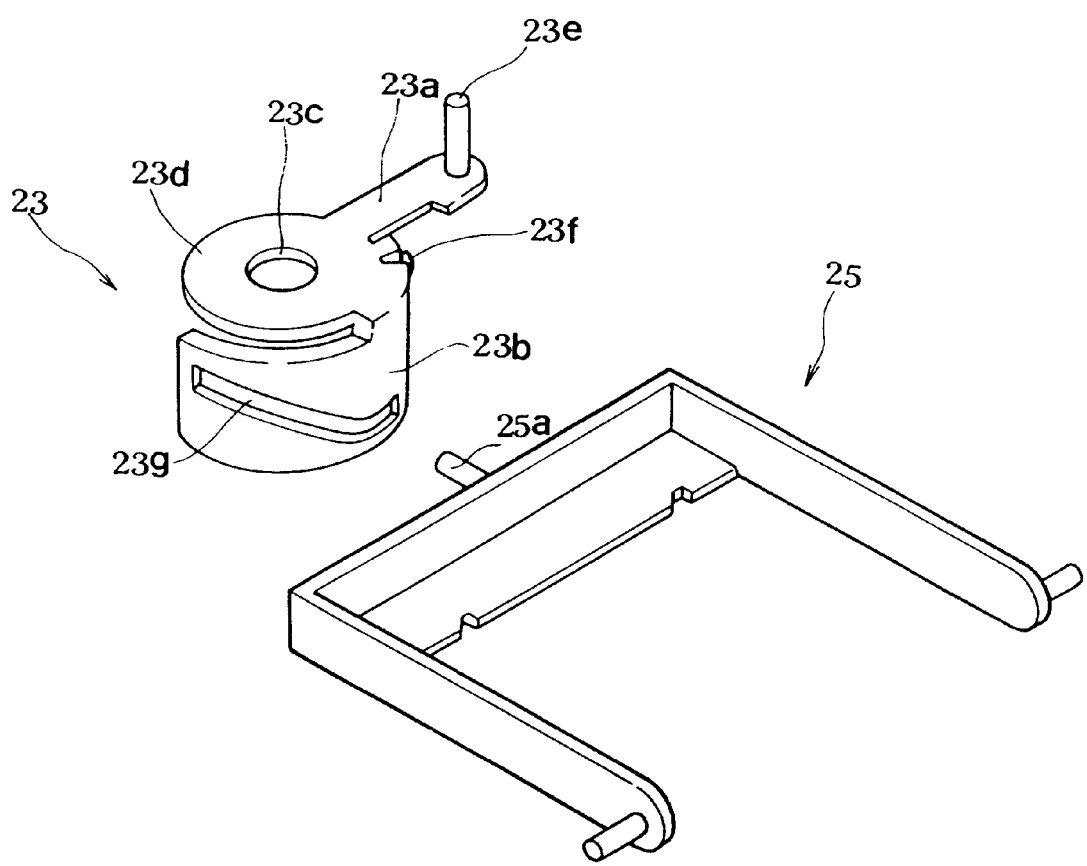

DEVICE FOR LOADING A TRAY DOWN INTO A PICK UP DISK PLAYER

BACKGROUND OF THE INVENTION

This invention relates to a loading device of a disc player using light such as CD (Compact Disc) or DVD (Digital Video Disc).

Generally, the disc player comprises a loading motor for loading and unloading a tray unit mounted on one side of a main base and for capturing a disc, and a driving motor for a pick-up mounted on another side of the main base and the pick-up formed on a guide shaft of the pick-up base to slide. Further, the loading device comprises a rack part formed on one side of the tray unit and combines a pinion gear which receives the turning effect from the loading motor into the rack part, thereby a corresponding movement of the disc is executed to a turn table formed on the pick-up base, and loading and unloading of the tray unit is executed by these structures.

Hereinafter the structure and movement of the disc loading device are described in detail by accompanying FIG. 1 to FIG. 3.

FIG. 1 is a perspective view of a general disc player, FIG. 2 is a top view of the FIG. 1, and FIG. 3 is a front view.

As shown in the above FIGS, a conventional disc player includes a tray 13, and a loading motor 2 mounted on one side of a main base 1 mounted within a main body 20, in which the turning effect of the loading motor 2 delivered through a belt 3 to an idle gear 7 having a pinicn gear 7a via a first and second gears 5, 6, the above gears compose a gear train from a pulley 4.

Further, an arm 9 is rotatively mounted on a shaft of the second gear 6, whereby the idle gear 7 is rotatively mounted on another shaft 9a mounted in a first end part 9b, and a guide bush 10 is protected on a second end part 9c. Then a cam 11 having a cam groove 11a is rotatively mounted on a cylindrical outer peripheral surface at lower side of the shaft 8, and lower side of the guide bush 10, which is extended toward the bottom side through a bush introducing grooie 12 formed on the main base 1, is inserted into a bush inserting groove 11b.

On the other hand, a rack gear 14 mounted according to driving direction of the tray 13 at one side of bottom surface of the tray 13 and combined with the pinion gear 7a of the idle gear 7, where the rack gear 14 includes a linear rack gear 14a mounted according to driving direction of the tray 13, and a circular rack gear 14b.

A sign 15 represents a protection formed on a pick-up supporting part for supporting a pick-up base (not illustrated) and combined with the cam groove 11a of the cam 11, where the; pick-up base is fixed with hinge on the main base 1 and on which the pick-up is mounted.

Regarding the above-identified structure, a movement process of the tray of conventional disc player is described in the following.

Firstly, when a loading signal is applied to the apparatus in state that the tray 13 is shifted to the main body 20, in other words, a disc D is placed on the ejected tray 13, the pulley 4 mounted on the motor shaft clockwise turns in accordance with driving of the loading motor 2, and the turning effect of the pulley 4 is delivered to the first gear 5, the second gear 6 and idle gear 7, thereby the pinion gear 7a which combined with the rack gear 14 of the tray 13 moves to a loading position of the tray 13.

If the pinion gear 7a which receives turn affect from the loading motor 1 clockwise turns, the tray 13 having the rack gear 14 moves in the direction of the arrow in FIG. 2. The movement of the tray 13 is finished when a rear end part of the linear rack gear 14a reaches to the pinion gear 7a as shown in FIG. 2; thereafter the apparatus is continuously driven for a safe landing on the turn table (not illustrated), when the movement of the tray 13 is finished.

Further, if the pinion gear 7a turns without stop when the movement of the tray 13 is finished, the arm 9 counterclockwise turns centering around the shaft 8 by a turning of the pinion gear 7a of the idle gear 7 mounted on the first end part of the arm 9 which is rotatively mounted on the shaft 8 of the second gear 6, and the pinion gear 7a moves in accordance with the circular rack gear 14b. In this process, the guide bush 10 also turns in a counterclockwise direction according to the guide groove 12.

At this time, the cam 11 turns centering around the shaft 8 by that the end part of the guide bush 10 is combined with the bush inserting groove 11b formed on a side of the cam 11, thereby the projection 15 of the sled base which combined with lower part of a eject portion (a first portion) (11d) of the cam groove 11a is placed in a loading position (a second portion) (11c) of the cam groove (11a), then the disc placed on the tray 13 lands on the turn table of the spindle motor by a movement of the pick-up base.

An unloading movement of the disc is executed by reversing the above movements.

In the conventional loading device of the disc tray, since the loading motor is fixed on a side of the main base, there are many components for delivering the driving power from the loading motor to the pinion gear, turning radius of the idle gear is large, and the large belt pulley is used, it is impossible to minimize the size of the apparatus is and to increase the delivered power.

Although not shown in the drawings, the prior art also requires a rocking device for holding the tray; therefore, the miniaturization of the apparatus is difficult.

SUMMARY OF THE INVENTION

The objects of the present invention are to overcome problems and disadvantages of the conventional device.

In order to achieve the above-mentioned objects, a loading device according to the present invention, as broadly defined and embodied herein, comprises a tray for movement between a loaded position and an ejected position; a loading motor having a motor shaft and mounted on a main base; and a driving means for moving the tray between the loaded position, and ejected position by power from the loading motor. The driving means is rotatably mounted centering on the motor shaft of the loading motor.

According to another aspect of the present invention, as embodied herein, a loading device for moving a tray of a disc player apparatus comprises a tray for supporting a disc, a loading motor having a motor shaft, and a driving part for moving the tray in more than one xds of motion by power derived from the loading motor. The driving part is rotatively mounted to the motor shaft.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 6 is a perspective view of a cam element and a sled base in accordance with the embodiment of the present invention.

DESCRIPTION OF THE PREFERRED EMBODIMENTS

Preferred embodiments of the present invention are described in detail hereinafter by accompanying drawings.

Figure 1:
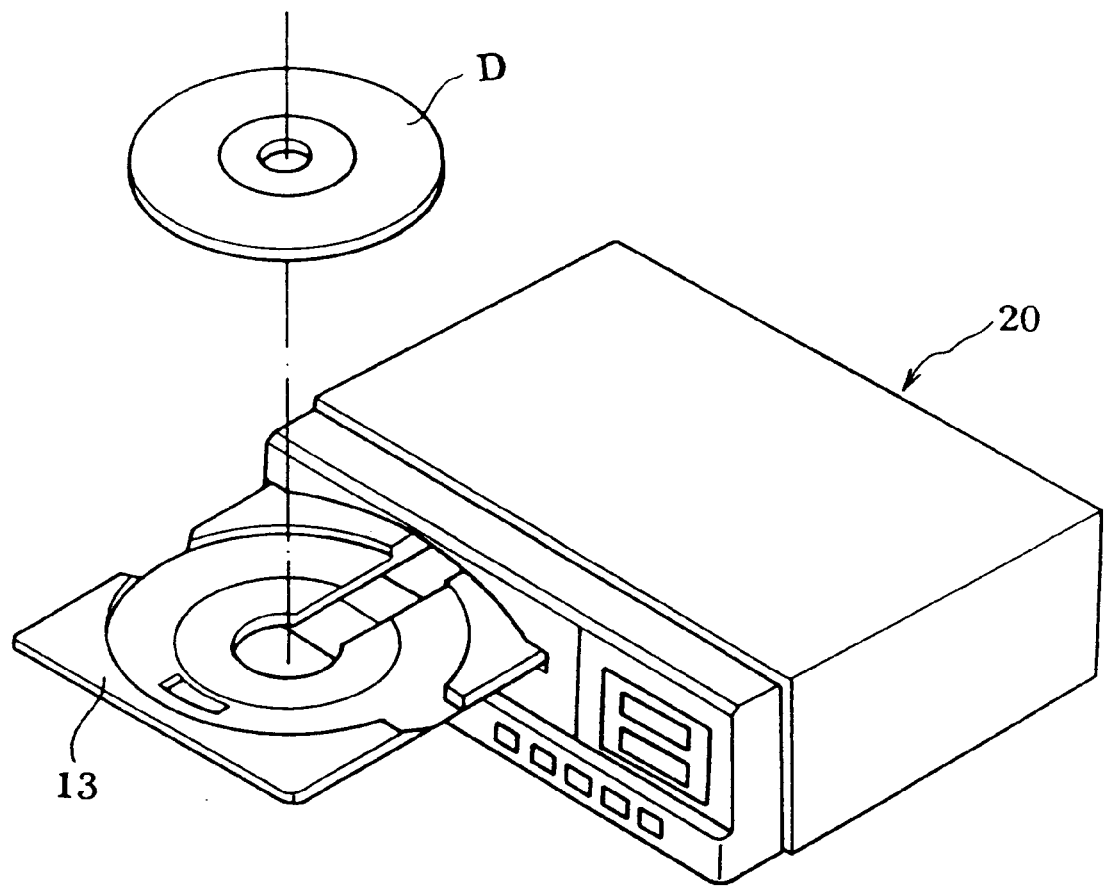
FIG. 1 is a perspective view of a general disc player showing major components of the type used in the present invention.
Figure 2:
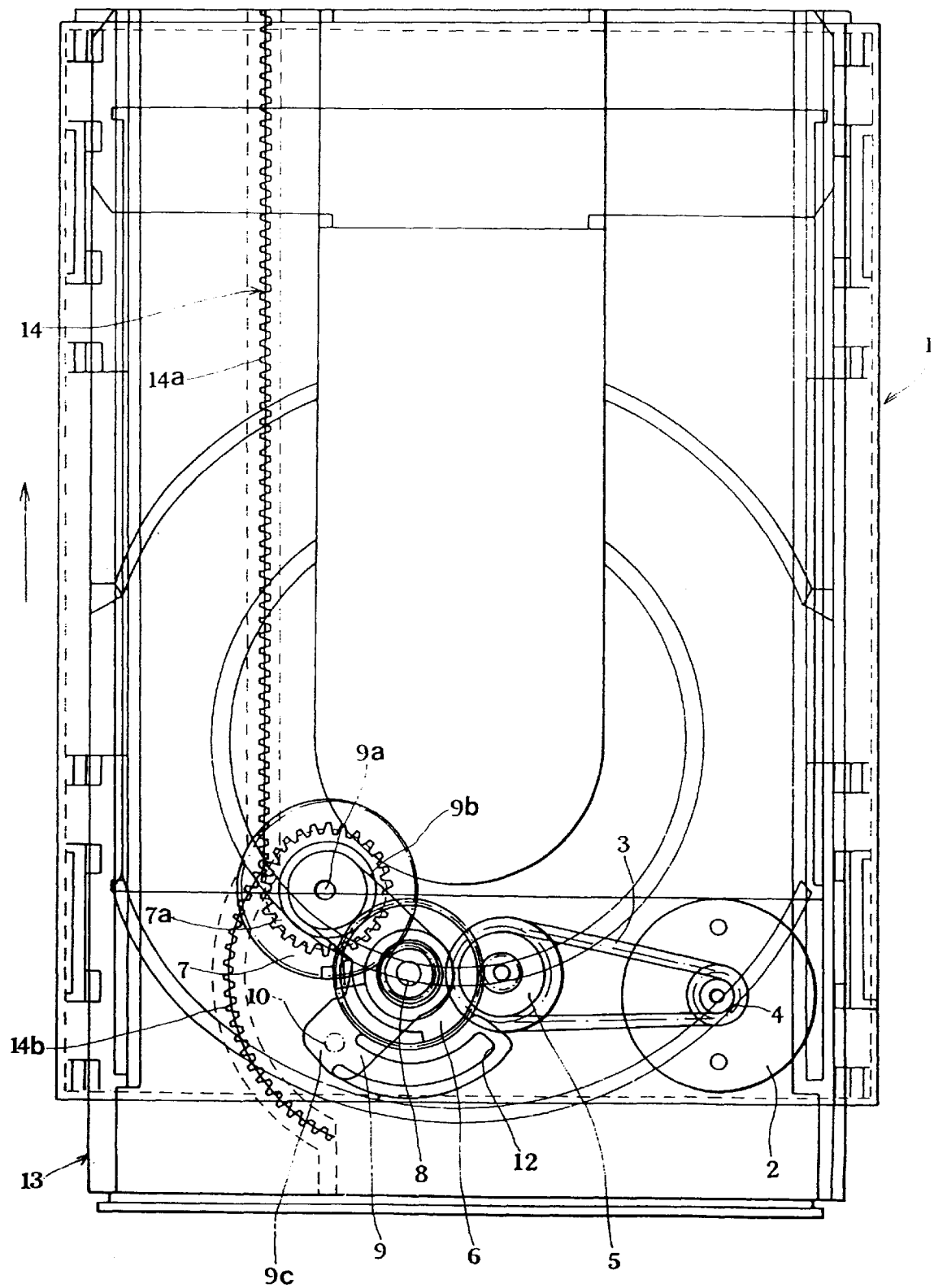
FIG. 2 is a top view of a loading portion of a conventional disc player.
Figure 3:
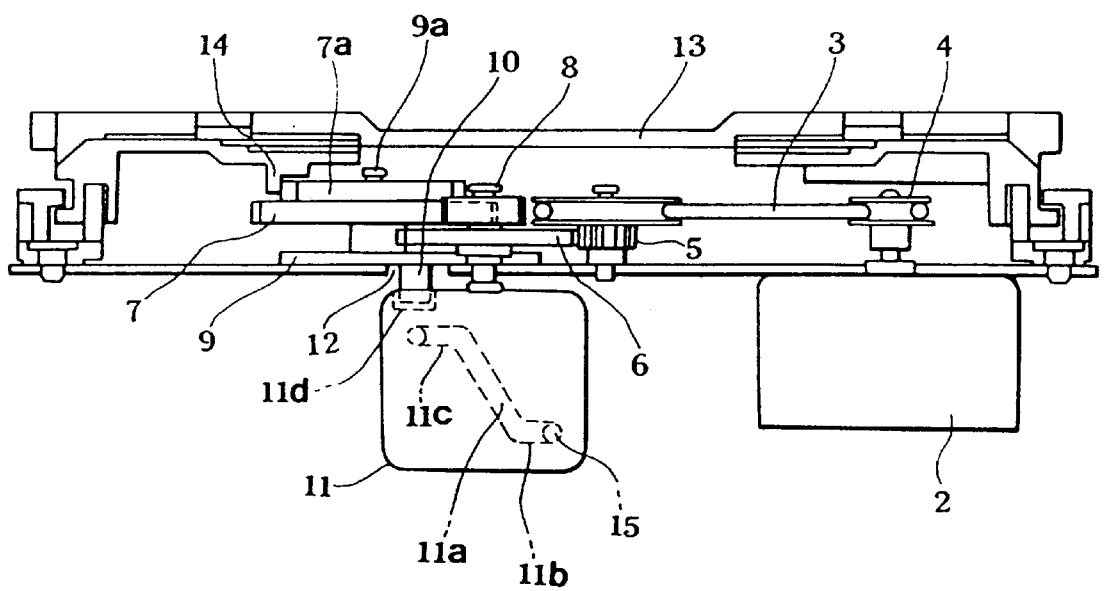
FIG. 3 is a front view of the loading portion of the conventional disc player of FIG. 2.
Figure 4:
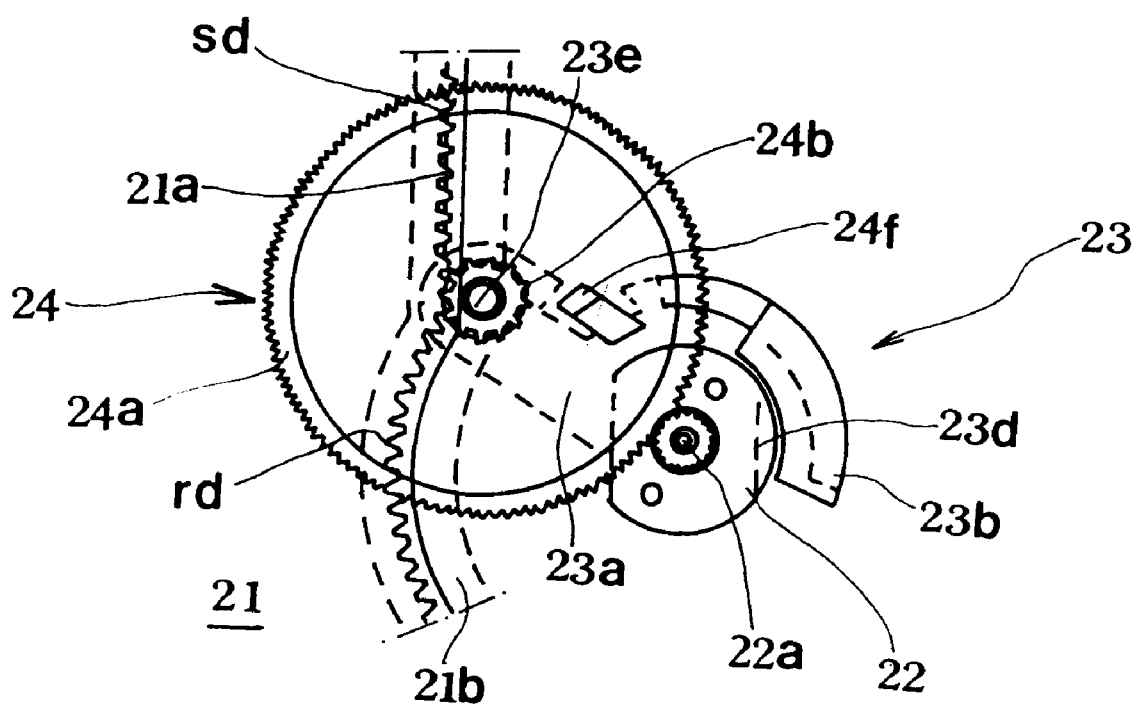
FIG. 4 is a top view of a loading device of a disc player in accordance with an embodiment of the present invention.
Figure 5:
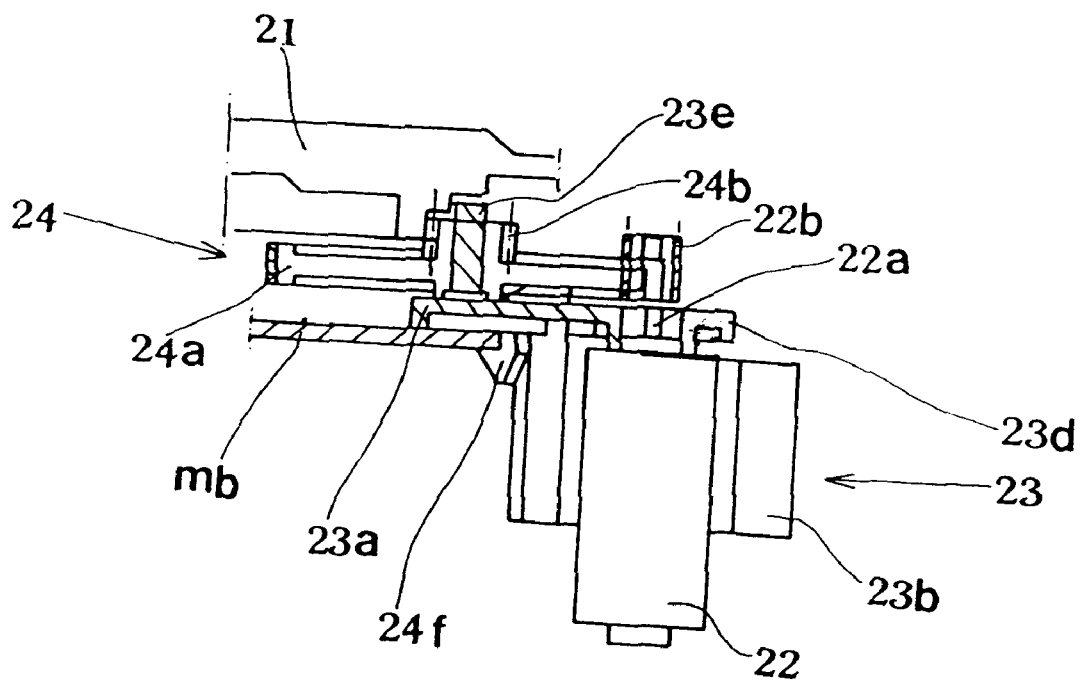
FIG. 5 is a front view of a loading device of a disc player in accordance with the embodiment of the present invention.

FIGS. 4 and 5 represent top and front views respectively of the loading device in accordance with the present invention, and FIG. 6 is a perspective view of the cam element around a sled base which is used with the cam element.

As shown in the drawings, the loading device of the disc player according to the present invention comprises a tray 21 on which a disc is placed, a loading motor 22 as a source of the driving power for moving the tray 21, a cam element 23 rotatively mounted on a shaft 22a of the loading motor 22, and a sled base 25 combined with an idle gear 24 and a cam part 23b of the cam element 23, where the idle gear 24 delivers the driving power from the loading motor 22 to the tray 21. Further, a rack 21a and an adjacent guide groove 21b are formed in the tray 21, and the rack 21a includes a linear section sd mounted along a length direction of the tray 21 and a circular section rd connected with an end part of the linear section sd.

In addition, a motor shaft gear 22b is mounted on the shaft 22a of the loading motor 22. The cam element 23 includes the plan-part 23d which includes the hole 23c for receiving the shaft 22a of the loading motor. The lever part 23a is extensively mounted from one side of the plan-part 23d and includes the shaft pin 23e at its end for vertically mounting the idle gear 24. The circular cam part 23b is extensively mounted from the outside of the plan-part 23d to a vertical lower part and surrounds a peripheral side of the loading motor 22. A hook 23f mounted between the lever part 23a and cam part 23b for supporting the cam element 23 with a main base mb, where the circular cam part 23b and the hook 23f are formed in a single body.

Further, the idle gear 24, which is mounted on the shaft pin 23e formed on the lever part 23a of the cam element 23, includes a large gear 24a and a small pinion gear 24b. Then the large gear 24a is connected to the motor shaft gear 22b on the motor shaft 22a. The pinion gear 24b is connected the rack part 21a of the tray 21 delivers driving power from the loading motor 22 to the tray 21. In the cam part 23b of the cam element 23, as shown in FIG. 6, a projection 25a formed on the base 25 is inserted into an inclined cam groove 23g which is formed on the peripheral side of the cam part 23b.

Hereinafter, a loading processes of the loading device in accordance with the present invention are described in detail.

Firstly, when a loading signal is applied to the apparatus in state that the tray 21 is shifted to the main base, a disc D is placed on the ejected tray 21, and the loading motor 22 is driven. Then the driving power is delivered to the rack part 21a of the tray 21 through the motor shaft gear 22b and the idle gear 24, thereby causing the tray 21 to move.

A continual horizontal movement of the tray 21 occurs until a rear end part of the linear section sd of the rack part 21a has been reached. The pinion gear 24b is halted by a stopper (not illustrated) formed on the main base, when the pinion gear 24b and a rear end part of the rack part 21a are crossed. In the above-mentioned movement, the cam element 23 is ejected, and then the projection 25a of the slide base is inserted into a lower end side of the cam groove 23g of the cam part 23b.

Further, when the loading motor 22 drives without stop when the tray 21 is stopped, the cam element 23 which includes the lever part 23a having the idle gear 24 turns in a counterclockwise direction, and then the pinion gear 24b of the idle gear 24 moves on the circular section rd of the rack part 21a.

Finally, when the cam element 23 turns, the projection 25a of the sled base 25 which is inserted in the cam groove 23g of the cam part 23b moves to the upper side of the groove. The sled base 25 is raised and the pick-up base (not illustrated) which is connected with the sled base is also raised toward a loading position. As a result, the disc placed on the tray 21 safely lands. on the turn table of the spindle motor.

On the other hand, an unloading process of the loading device according to the present invention is executed in the opposite order of the loading process In the loading device in accordance with the present invention, it is possible to minimize the size of the apparatus and to increase the delivered power, in accordance with an horizontal movement of the tray and a lifting of the sled base by the cam element mounted on the shaft of the loading motor and the idle gear mounted on the cam lever.

While the described embodiment represents the preferred form of the present invention, it is to be understood that modifications will occur to those skilled in that art without departing from the spirit of the invention. The scope of the invention is therefore to be determined solely by the appended claims.

Other embodiments of the invention will be apparent to those skilled in the art from consideration of the specification and practice of the invention disclosed herein. It is intended that the specification and examples be considered as exemplary only, with a true scope and spilit of the invention being indicated by the following claims.

What is claimed is:

1. A loading device for moving a tray of a disc player apparatus, comprising:

a tray for movement between a loaded position and an ejected position;

a loading motor having a motor shaft, and being mounted on a main base; and driving means for moving the tray between the loaded position and the ejected position by power derived from the loading motor, the driving means being rotatively mounted centering on the motor shaft of the loading motor, wherein the driving means comprises:

a tray driving part mounted on the motor shaft; and a circular cam part having a cam groove formed on its peripheral side, where the circular cam part is connected to the tray driving part by a single body, and is extensively mounted from the outside of the tray driving part to surround a peripheral side of the loading motor, wherein the tray driving part comprises:

a lever part extensively formed from one side of the tray driving part;

a shaft pin mounted on the lever part; and an idle gear assembly mounted on the shaft pin.

2. The loading device in accordance with claim 1, wherein the idle gear assembly comprises:

a small gear connected to the motor shaft; and a large gear connected to the tray and mounted with the small gear in a single body.

* * * * *